United States Patent [19]

Tsunoda

[11] 3,744,643
[45] July 10, 1973

[54] SUSPENSION CLEARING TREATMENT DEVICE
[75] Inventor: Shogo Tsunoda, Tokyo-to, Japan
[73] Assignee: Ebara Infilco Kabushiki Kaisha, Tokyo, Japan
[22] Filed: June 11, 1971
[21] Appl. No.: 152,124

[30] Foreign Application Priority Data
June 15, 1970 Japan.............................. 45/51739

[52] U.S. Cl................................. 210/522, 210/534
[51] Int. Cl............................................ B01d 21/00
[58] Field of Search................... 210/513, 519–523, 210/532–537

[56] References Cited
UNITED STATES PATENTS
2,799,645   7/1957   Musgrove ...................... 210/521 X
3,067,878  12/1962   Genter et al. .................... 210/521 X
1,403,311   1/1922   Gaillet ............................ 210/513 X FOREIGN PATENTS OR APPLICATIONS
563,059   9/1958   Canada............................ 210/521

Primary Examiner—Samih N. Zaharna
Assistant Examiner—T. A. Granger
Attorney—Alex Friedman, Harold I. Kaplan et al.

[57] ABSTRACT

A device for clarifying suspensions comprises an aggregation chamber, a floc-forming chamber and a settling chamber. The aggregation chamber has therein partitions to provide circuitous flow therethrough, preferably in a vertical direction. Openable ports are provided at the bottom of the aggregation chamber for removal of aggregate which might interfere with the flow of fluid therethrough. Flow of fluid from one chamber to another is essentially radial.

11 Claims, 19 Drawing Figures

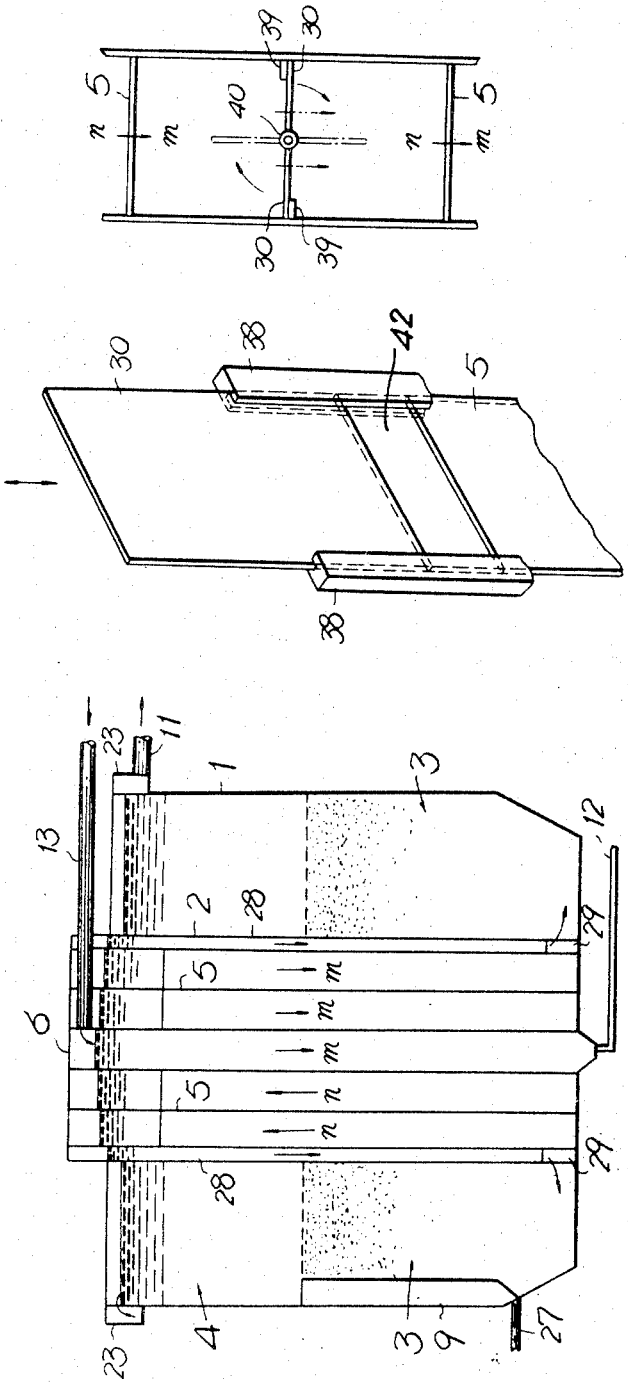

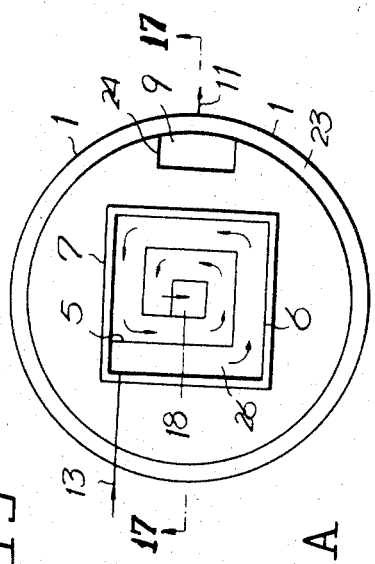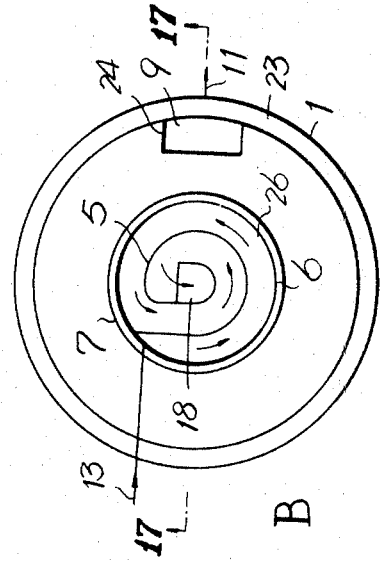
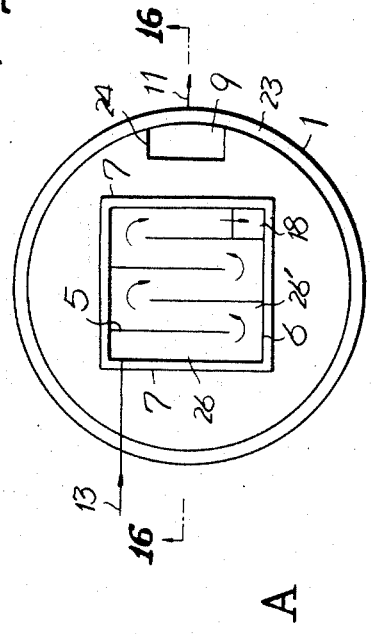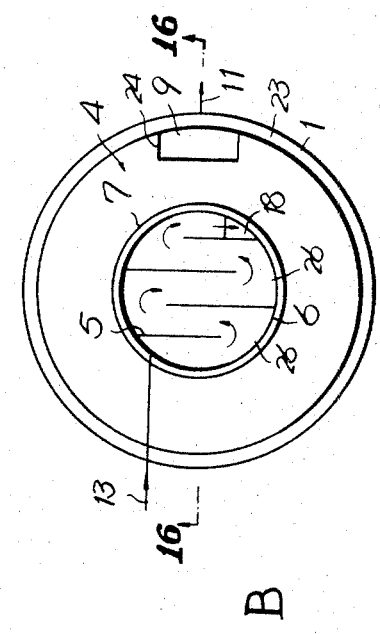
Fig-15
Fig-14

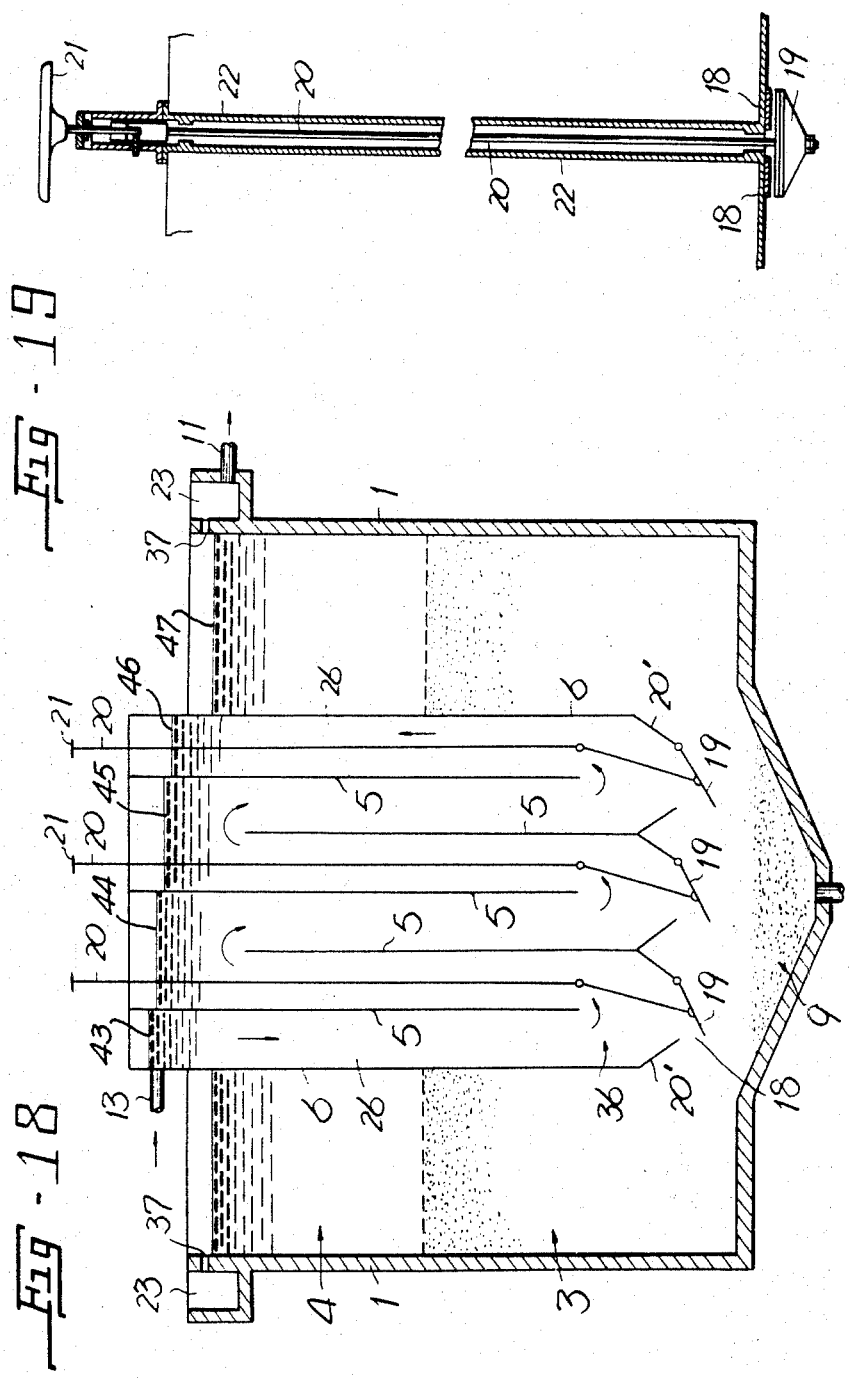

SUSPENSION CLEARING TREATMENT DEVICE

BACKGROUND OF THE INVENTION

Where suspensions are to be supplied to a setting device in varying quantity and in varying ratio of solids to fluid, the devices designed for such duty have been complex in construction and difficult in operation. Moreover, difficulties have been encountered in the distribution of fluid from one section of the device to another; the consequence of non-uniform fluid distribution is lowered settling efficiency.

Attempts have been made to cope with this problem by providing for vertical flow of the suspension through a floc-forming section in which the direction of flow is alternately upward and downward. Conventional devices of this design have suffered from the difficulty that impurities such as sand or floc formed in the chamber settled at the bottoms of passages and impeded the flow. The problem cannot be avoided by increasing the rate of flow since this interferes with the formation of the floc. Solution of the problem has been attempted by providing a sludge removal port at the lower end of each of the vertical passages, but the number of ports required is so great that both the original cost and the cost of operation make this design uneconomical. Furthermore, it has proved to be difficult to distribute the flow emanating from the floc-forming section in a uniform manner so that the surface of the pool outside the floc-forming chamber is essentially horizontal.

SUMMARY OF THE INVENTION

The suspension clarifying device of the present invention consists of an aggregating chamber wherein the direction of fluid flow is predominantly vertical, a distribution system leading to a plurality of pits narrower at the bottom than at the top, and a concentrating chamber wherein sludge is formed. These members are contained in a tank the walls of which are higher than a partition wall dividing the pits from the settling chamber. Aggregation of the suspension takes place in the aggregating chamber, the aggregate is converted to floc in the pits, and the floc is converted to sludge in the concentrating chamber. Clogging of the aggregating chamber is avoided by providing ports at the bottom of the passages in the aggregating chamber. The passages and the ports are so arrayed that up to six passages in the aggregating chamber can be cleared by the displacement of a single cover, thus greatly decreasing the complexity and the cost of the system. The rate of flow of fluid suspension through the system can be controlled by movement of partitions within the aggregating chamber, thus altering the size of the openings between the passages in the aggregating chamber.

Accordingly, an object of the invention is to provide a device for clarifying suspensions wherein the device is economical both with respect to original cost and cost of operation.

Another object of the invention is to provide a device for clarifying suspensions in which aggregation, formation of floc and concentration of sludge occur in separate chambers.

Still another object of the invention is to provide a suspension clarifying device in which the rate of flow of suspension therethrough can easily be controlled.

A further object of the invention is to provide a suspension clarifying device wherein the aggregating chamber has ports at the bottom thereof, displacement of a single port cover serving for removal of sediment from the bottoms of a plurality of passages in said aggregation chamber.

Still other objects and advantages of the invention will in part be obvious and will in part be apparent from the specification.

The invention accordingly comprises the features of construction, combination of elements, and arrangement of parts which will be exemplified in the construction hereinafter set forth, and the scope of the invention will be indicated in the claims.

BRIEF DESCRIPTION OF THE DRAWING

For a fuller understanding of the invention, reference is had to the following description taken in connection with the accompanying drawing, in which:

FIG. 11 is an elevational cross section taken along line 11—11 of FIG. 10;

FIG. 12 shows in perspective a movable partition of an aggregating chamber;

FIG. 13 shows a rotatable vane used for controlling rate of flow through the device;

FIGS. 14A, 14B, 15A and 15B show in plan view arrangements of partitions within aggregating chambers;

FIG. 18 shows diagrammatically in elevational cross section an arrangement of partitions within an aggregating chamber;

FIG. 19 shows an elevational cross section, an apparatus for opening ports in an aggregating chamber.

DESCRIPTION OF THE PREFERRED EMBODIMENTS

Figure 1:
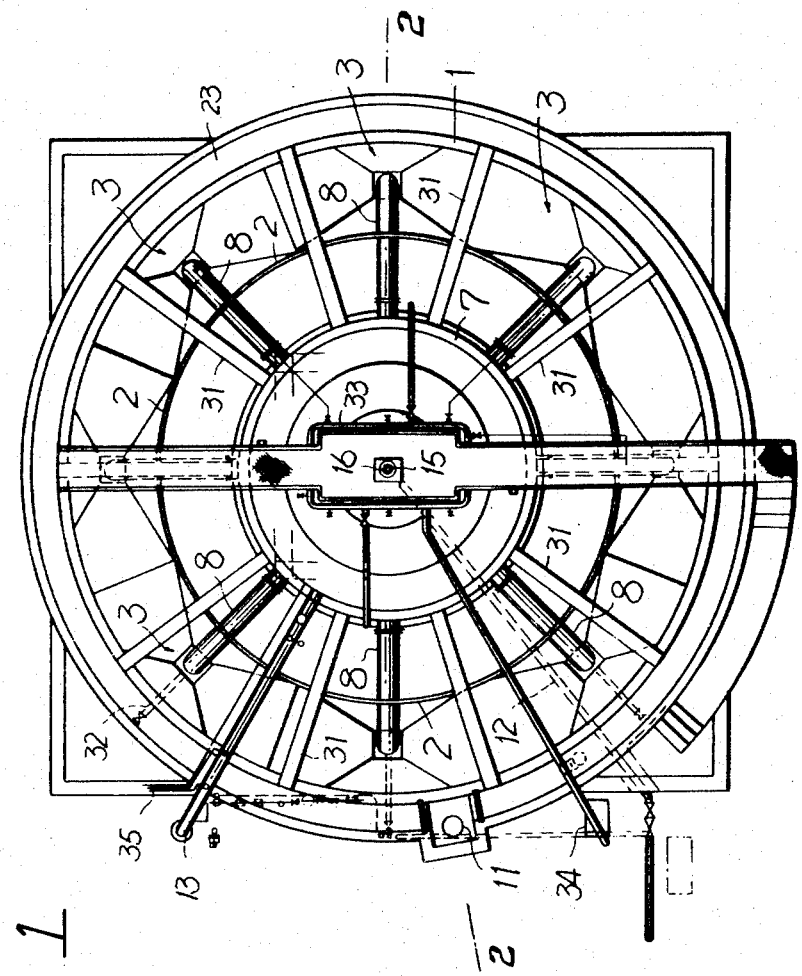
FIG. 1 is a plan view of a device in accordance with the present invention.
Figure 2:
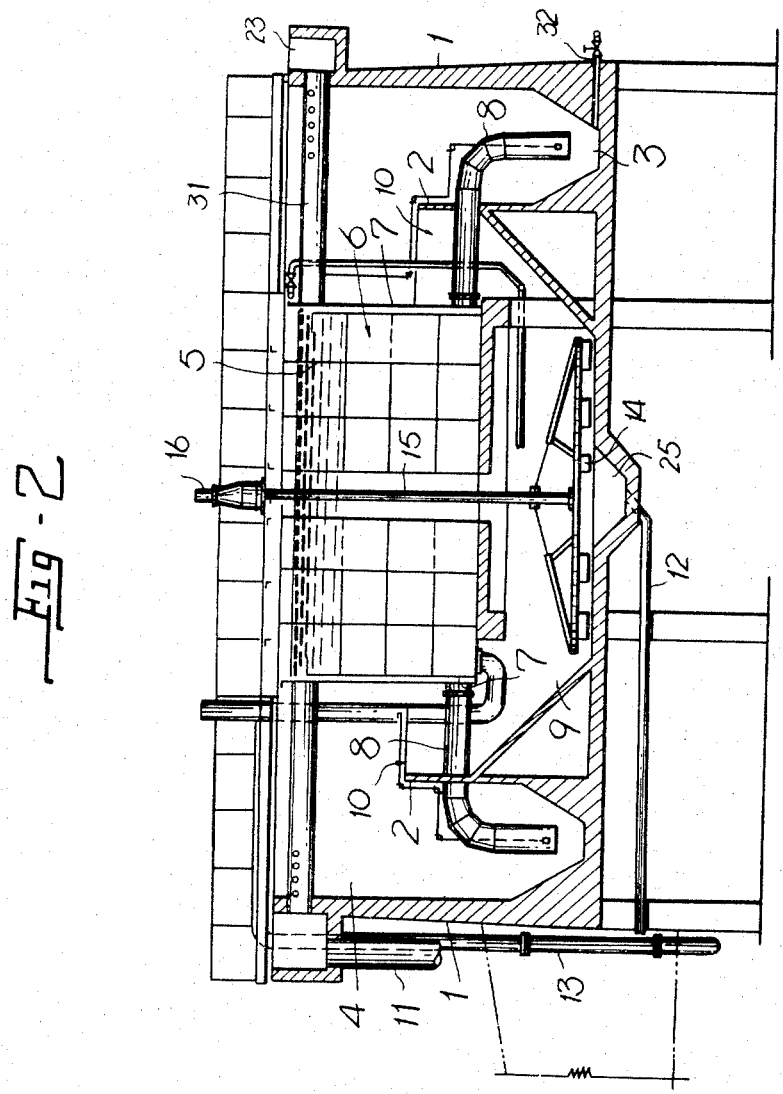
FIG. 2 is an elevational view in cross section taken along line 1—1 of FIG. 1.

In accordance with the present invention, a device for clarifying suspensions comprises a tank which is preferably either circular or square and inlet means for the introduction of suspension to be treated, means for adding chemicals to the in-flowing suspension, an aggregating chamber, a distribution chamber around the aggregating chamber, flocculating pits around the periphery of the tank, pipes for distributing the effluent from the aggregating chamber and distribution chamber to the pits in uniform fashion, a concentrating chamber into which the floc from the floc-forming pits overflows, and effluent pipes for the outflow of clarified fluid from the tank. In addition, pipes are provided for removal of sludge formed in the concentrating section. Such a device is shown in FIGS. 1 and 2 wherein the tank 1 has therein floc-forming pits 3 and a partition wall 2 bounding said pits and over which floc flows to a concentrating chamber 9. The fluid containing suspended solid matter enters the tank through an intake pipe 13 which provides suspension to an aggregating chamber 6. The aggregating chamber has therein partitions 5 which control the direction of flow of the suspension therethrough. Surrounding the aggregating chamber is a distribution chamber 7 into which the contents of the aggregating chamber overflow. The fluid, containing aggregate, leaves the distribution chamber 7 by way of pipes 8 and is distributed uniformly to the pits 3. Floc forms in the pits 3, overflows the partition 2 and passes through annular passageway 10 into the concentrating chamber 9. The floc is concentrated into sludge with the assistance of rotating scraper 14 and drops into sludge pit 25 from which it can be removed through sludge removal pipe 12. Clarified liquid rises in the tank and enters tubes 31 which have perforations in the tops thereof and leaves the system through cleared effluent tube 11. The rotating scraper 14 is connected to a drive means 16 through a drive shaft 15. The pits can be drained through drain tubes 32.

It should be noted that perforations in tubes 31 are located below the top of the aggregating chamber 6. As a result, a liquid level can be established in the aggregating chamber which is higher than the perforations in the tubes 31 so that flow throughout the device proceeds by means of gravity. Also, the height of the partition 2 is such that satisfactory concentration of the sludge can occur in the concentrating chamber 9 and satisfactory clarification of the fluid can occur in the space between the top of the partition 2 and the perforations in the tubes 31.

Preferably, the perforated tubes 31 lead into a channel 23 completely surrounding the tank. The clarified effluent is drained from the channel 23 through pipes 11.

This system of aggregating chamber, floc-forming pits and concentrating chamber has proved to be so effective that upward flowing rates of 150-500 mm/min have been achieved. Such rates have hitherto been considered impossible where a fully clarified fluid must be obtained. Best results are obtained when the direction of suspension flow through the aggregating chamber is essentially vertical and when fluid from the aggregating chamber enters the pits proximate the bottoms thereof. The system moreover, is highly symmetrical so that all portions of the tank operate with equal efficiency.

Figure 3:
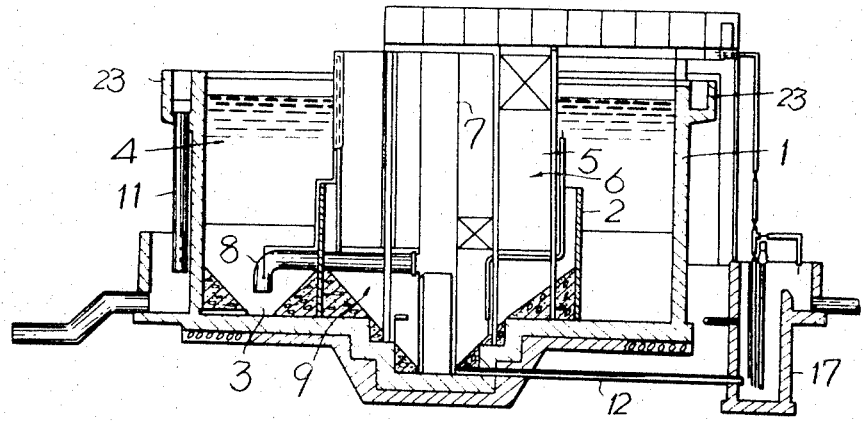
FIG. 3 is an elevational cross-sectional view of another embodiment of the invention.
Figure 4:
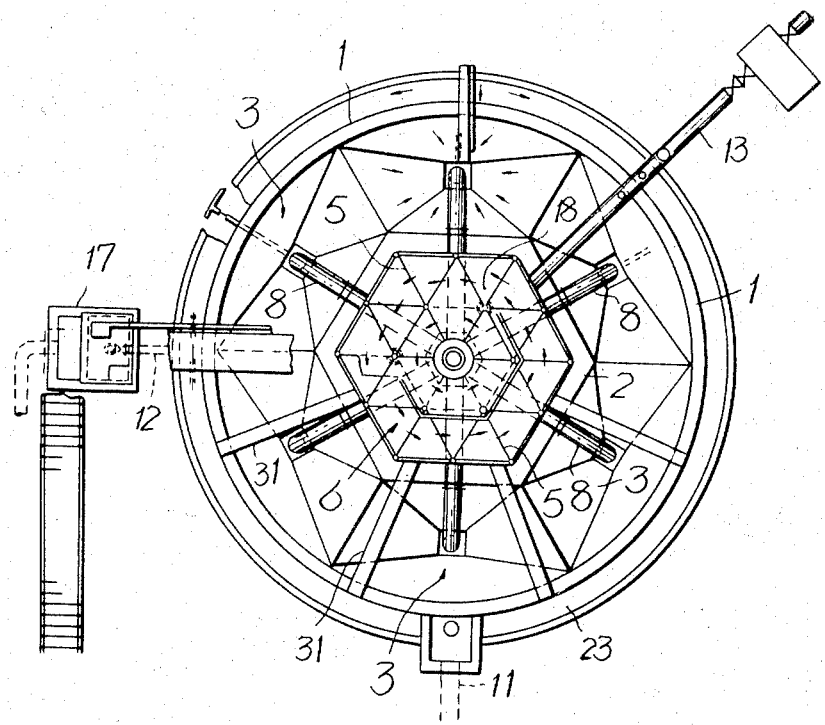
FIG. 4 is a plan view of the embodiment of FIG. 3.

Although it is preferable that a scraper be used in combination with the concentrating chamber, this is not absolutely necessary. An embodiment in which the scraper is absent is shown in FIGS. 3 and 4.

Figure 5:
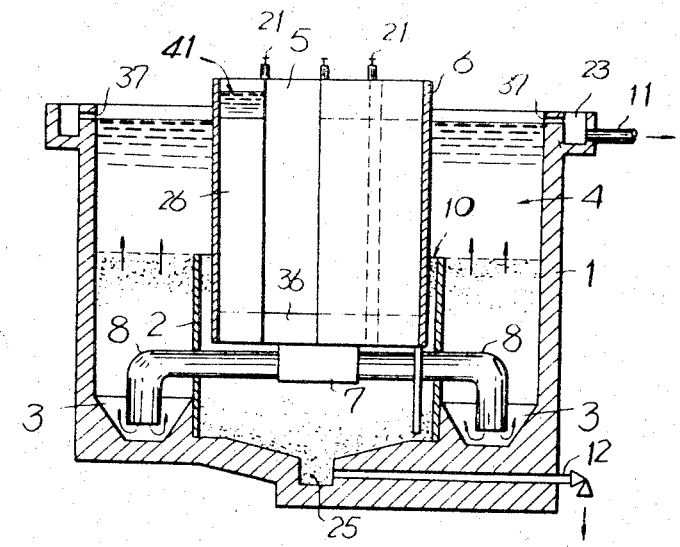
FIG. 5 is an elevational view in cross section of yet another embodiment of the invention.
Figure 6:
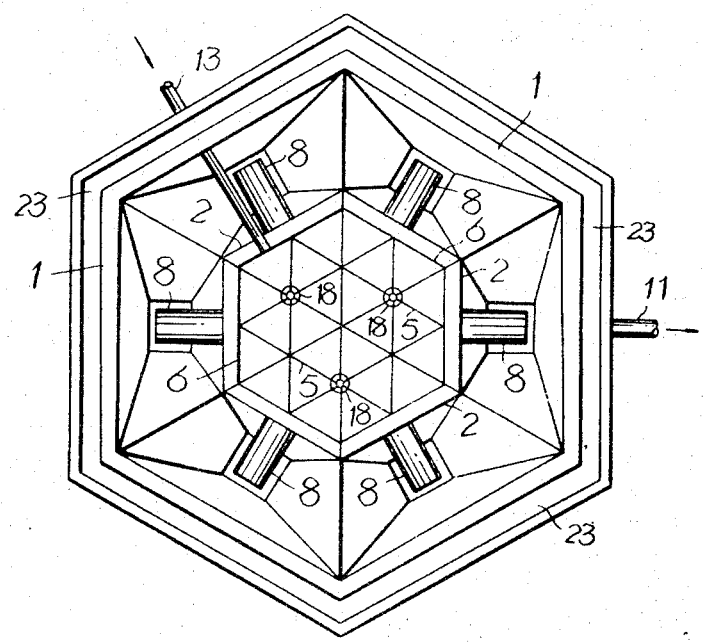
FIG. 6 is a plan view of the embodiment of FIG. 5.
Figure 8:
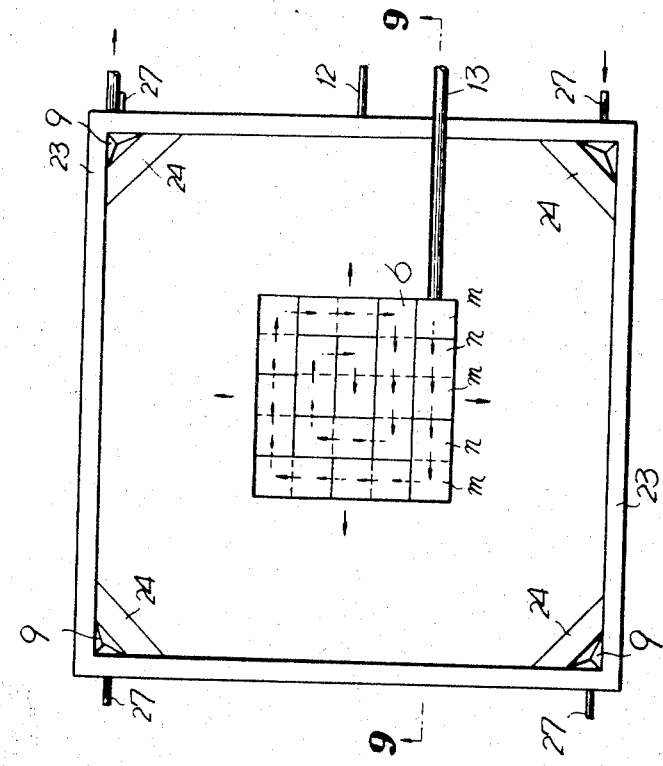
FIG. 8 is a plan view of a square embodiment of the invention.
Figure 7:
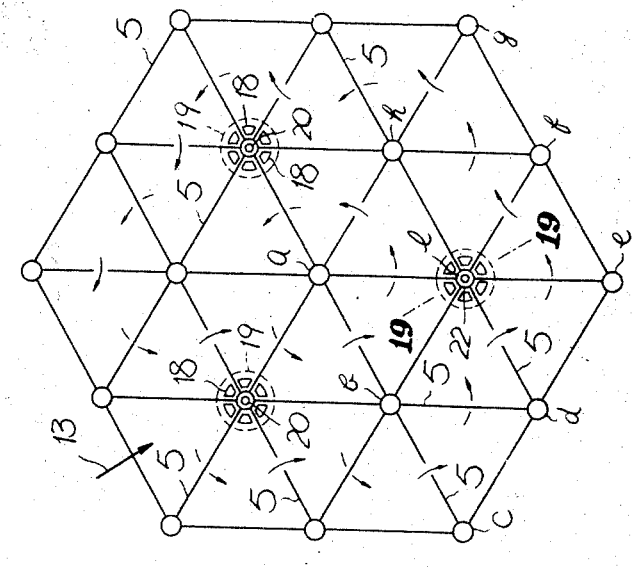
FIG. 7 is a diagrammatic plan view of an aggregating chamber.
Figure 9:
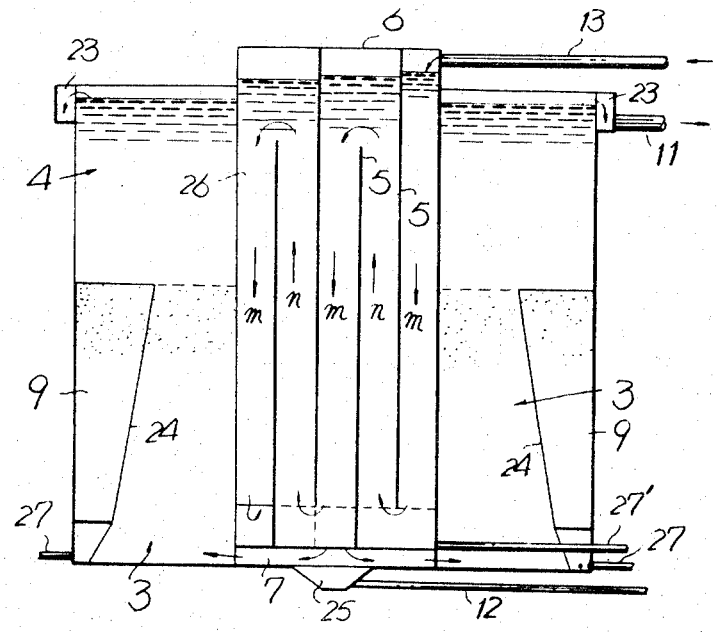
FIG. 9 is an elevational cross section taken along line 9—9 of FIG. 8.

As has been indicated, sediment is apt to collect at the bottoms of passages in the aggregating chamber. This sediment, composed of relatively heavy particles such as sand can clog the passages and impede flow of fluid therethrough. Conventionally, each passage is provided with an openable port through which the sediment can be removed, preferably by gravity. Since a handle and a connecting rod are required for each port, such a system is complex, expensive in construction and in operation. It is preferable that a single port-cover serve for the removal of sludge from a plurality of passages. Systems of this type are shown in FIGS. 5 through 8. Handles 21 are shown in FIG. 5 for the displacement of port-covers. Arrangements of vertical passages suitable for such multiple ports are shown in FIGS. 6, 7 and 8. The triangular array of partitions 5 in the aggregating chamber 6 is shown in plan view in FIG. 6. This array is shown on a larger scale in FIG. 7 which indicates how a single port-cover 19 can serve for the removal of sludge from as many as six passages. The embodiment of FIG. 8 shows a square array wherein four passages can be cleared by means of a single port-cover (not shown). In this embodiment, the pits 9 are bounded by partition walls 24 located in the corners of the square tank 1. Further detail on the construction of a multiple port 18 is shown in FIG. 19 where 21 is a handle, 20 is a shaft connecting the handle 21 to the port-cover 19, fitting over ports 18. The shaft 20 passes through hollow tube 22.

Figure 10:
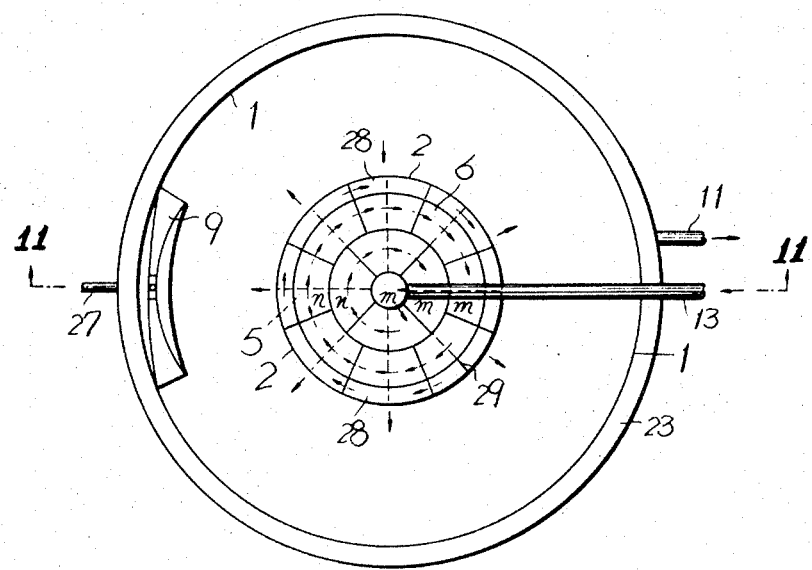
FIG. 10 is a plan view of another embodiment of the invention.

As is evident, downward flow through a vertical passageway in the aggregating chamber must be followed by upward flow in the next passageway, and vice versa. No horizontal passages are needed in such a system provided that flow is from one passageway to the next contiguous passageway, as a result of which openings, alternately at the tops and bottoms of passageways, suffice. Triangular and square arrays are possible as shown in FIGS. 6, 7 and 8, which are plan views and in FIG. 9 which is an elevational cross section taken along the line 9—9 of FIG. 8. An arrangement consisting of annuli around a central passageway where each annulus consists of a plurality of vertical passageways is shown in FIG. 10. In FIGS. 8 through 11, the letter $m$ indicates downward flow and the letter n indicates upward flow.

The rate of flow of suspension through the system depends on the size of the openings between passageways. The partitions 29 may themselves be movable as indicated in FIG. 11, but in another embodiment, flow regulating plates 30 sliding in guides 38 may be provided. In this way gap 42 between the partition 5 and flow regulating plate 30 may be controlled as desired. In another embodiment as shown in FIG. 13 the flow regulating plate 30 rotates on a spindle 40 from a wide open position as shown by the broken lines in FIG. 13 to a closed position in which the plate 30 rests against stops 39.

Figure 16:
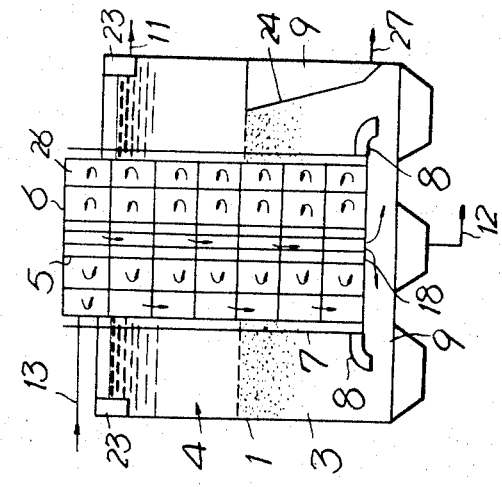
FIGS. 16 and 17 show in elevational cross-sectional view arrangements of partitions within aggregating chambers.
Figure 17:
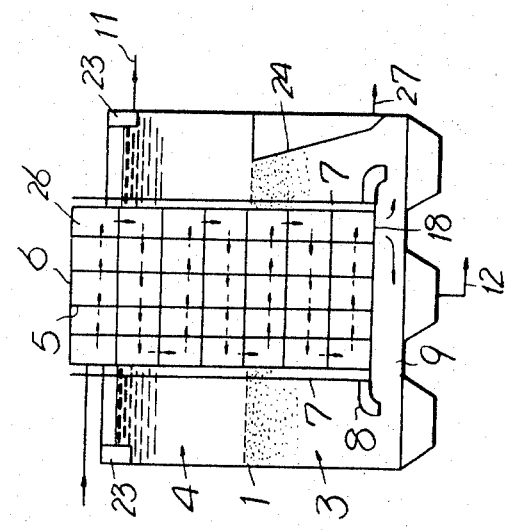

Although the direction of flow through the aggregating chamber is preferably in a vertical direction, effective clarification of suspensions has also been achieved with aggregating chambers in which the flow is predominantly horizontal. Diagrammatic plan views of aggregating chambers of this type are shown in FIGS. 14A, 14B, 15A and 15B wherein horizontal passages 26' in the aggregating chamber 6 lead the fluid either through a zig-zag course or through a course resembling a vortex. These arrangements are further shown in FIGS. 16 and 17 in elevational cross-sectional diagrammatic view.

As stated above, flow through the system proceeds by gravity. As a consequence, successive liquid levels must be lower than each preceding level. Thus liquid level 43 (FIG. 18) is higher than liquid level 42 and so on through successive passages of the aggregation chamber 6 having liquid levels 44 and 45. Liquid level 46 must, in turn, be higher than drain hole 37 so that liquid level 47 must rise to the level of the drain hole 37 before clarified effluent can leave the tank.

In the design of the aggregating chamber it is desirable that the chamber walls rise sufficiently above the effluent drain ports so that flow rates in the range of 0.01 — 0.7 m/s be achieved in the vertical passages thereof and so that the holding time of fluid in the aggregating chamber is in the range of 2-10 minutes. The flow rate and holding time are, of course, also dependent on the positioning of the flow regulating plates 30.

Accessories to the above device which facilitate operation are piping 33 for high pressure water driven by pump 34 and chemical addition tube 35.

It will thus be seen that the object set forth above, among those made apparent from the preceding description, are efficiently attained and, since certain changes may be made in the above construction without departing from the spirit and scope of the invention, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

I claim:

1. A device for clarifying suspensions, comprising a tank having upstanding side-walls; means for supplying a suspension to be clarified; means defining a circuitous passage disposed proximate the center of and above the bottom of said tank, said circuitous passage means having entrance and exit ends and comprising vertical partitions having alternate bottom and top openings in successive partitions, said partitions defining a plurality of polygonal, vertical compartments so that flow of suspension through said compartments is alternately upward and downward, said suspension-supplying-means being disposed to supply said suspension to said entrance end of said circuitous passage, said circuitous passage constituting a chamber for the aggregation of fine material and settling of heavy particulate matter; a distribution chamber surrounding said aggregation chamber; first connecting means connecting said exit end of said circuitous passage with said distribution chamber for flow of suspension thereinto; at least one tapered pit within said tank and external to said distribution chamber; second connecting means connecting said distribution chamber with said tapered pit proximate the bottom thereof, there being one second connecting means from said distribution chamber to each pit, whereby the direction of flow of fluid in said pit is upward, said pit serving for the formation of floc; an annular wall intermediate said tank wall and distribution chamber, said annular wall being lower in height than said distribution chamber and in combination with the bottom of said tank defining a concentration chamber into which floc from said fluid rising out of said tapered pit can pass by flowing over said annular wall and be concentrated to a sludge as the remaining clarified fluid rises toward the top of said pit; means for removing sludge from said concentration chamber; and means for removing said clarified fluid from proximate the top of said pit to the exterior of said tank, the fluid levels in said aggregation chamber being higher than said means for removing clarified fluid so that flow through said device is accomplished by gravity alone.

2. A device as defined in claim 1 wherein said compartments are in one of triangular and rectangular array, and further comprising at least one port common to at least two of said compartments, a cover normally in closed position against said port and displacing means for removing said cover from said port to allow collected heavy particulate matter to fall into said concentration chamber and for replacing said cover against said port, whereby the number of ports and displacing means is substantially fewer than the number of vertical compartments in said aggregating chamber.

3. Device as defined in claim 1, further comprising a rotating scraper within said concentrating chamber, said scraper serving to increase the rate of settling of said floc.

4. Device as defined in claim 1, wherein said essentially vertical passaages are triangular in cross-section and are so arrayed that each partition other than a boundary wall serves for two passages, and a port is in each passage located at the junction point of 6 triangular passages, whereby displacement of one port-cover serves for the removal of sedimented material from 6 passages.

5. Device as defined in claim 1, wherein at least one partition within said aggregating chamber is movable, thereby providing for altering the size of at least one opening and providing control over the rate of flow of said suspension through said device.

6. Device as defined in claim 1, wherein said essentially vertical passages are arrayed in a central passage and concentric annuli about said central passage, each annulus having a plurality of passages therein, said inlet means introduces suspension into said central passage and the course of flow is through each of the contiguous passages in a single annulus before entering the next outer annulus.

7. Device as claimed in claim 1 wherein the number of passages is such that the direction of flow through the last passage is in a downward direction.

8. A device for clarifying suspensions, comprising a tank having upstanding side-walls; means for supplying a suspension to be clarified; means defining a circuitous passage disposed proximate the center of and above the bottom of said tank, said circuitous passage means having entrance and exit ends, said circuitous passage constituting a chamber for the aggregation of fine material and settling of heavy particulate matter; a distribution chamber surrounding said aggregation chamber; first connecting means connecting said exit end of said circuitous passage with said distribution chamber for flow of suspension thereinto; at least one tapered pit within said tank and external to said distribution chamber; second connecting means connecting said distribution chamber with said tapered pit proximate the bottom thereof, there being one second connecting means from said distribution chamber to each pit, whereby the direction of flow of fluid in said pit is upward, said pit serving for the formation of floc; an annular wall intermediate said tank wall and distribution chamber, said annular wall being lower in height than said distribution chamber and in combination with the bottom of said tank defining a concentration chamber into which floc from said fluid rising out of said tapered pit can pass by flowing over said annular wall and be concentrated to a sludge as the remaining clarified fluid rises toward the top of said pit; means for removing sludge from said concentration chamber; and means for removing said clarified fluid from proximate the top of said pit to the exterior of said tank, the fluid levels in said aggregation chamber being higher than said means for removing fluid so that flow through said device is accomplished by gravity alone.

9. A device as defined in claim 8, wherein said means defining said circuitous passage is at least one vertical partition reaching from the bottom of said chamber to a height above the fluid in said chamber, whereby flow of fluid through said chamber is essentially horizontal with sediment in said fluid dropping to the bottom of said chamber and lighter material forming aggregate proximate the surface of said fluid.

10. A device as defined in claim 8 wherein said circuitous passage is essentially spiral-shaped, said spiral being either rectangular or arcuate.

11. A device as defined in claim 8 wherein said circuitous passage provides for successive horizontal and downward flow of said suspension the direction of horizontal flow being reversed after each section of downward flow.

* * * * *